United States Patent
Bartlett et al.

(10) Patent No.: US 10,838,916 B2
(45) Date of Patent: *Nov. 17, 2020

(54) ACCESS CONTROL FOR UNPROTECTED DATA STORAGE SYSTEM ENDPOINTS

(71) Applicant: International Business Machines Corporation, Armonk, NY (US)

(72) Inventors: Nicholas Tyler Bartlett, Chapel Hill, NC (US); Peter Haumer, San Jose, CA (US); Arthur Gary Ryman, Ontario (CA)

(73) Assignee: International Business Machines Corporation, Armonk, NY (US)

( * ) Notice: Subject to any disclaimer, the term of this patent is extended or adjusted under 35 U.S.C. 154(b) by 78 days.

This patent is subject to a terminal disclaimer.

(21) Appl. No.: 16/166,206

(22) Filed: Oct. 22, 2018

(65) Prior Publication Data

US 2019/0057107 A1 Feb. 21, 2019

Related U.S. Application Data

(63) Continuation of application No. 14/724,972, filed on May 29, 2015, now Pat. No. 10,108,628, which is a
(Continued)

(51) Int. Cl.
*G06F 16/00* (2019.01)
*G06F 16/13* (2019.01)
(Continued)

(52) U.S. Cl.
CPC ............ *G06F 16/13* (2019.01); *G06F 16/148* (2019.01); *G06F 16/176* (2019.01);
(Continued)

(58) Field of Classification Search
CPC .. G06F 16/13; G06F 16/24534; G06F 16/248; G06F 16/245; G06F 16/176;
(Continued)

(56) References Cited

U.S. PATENT DOCUMENTS

| 4,445,177 | A | * | 4/1984 | Bratt | ........................ G06F 8/41 |
| | | | | | 712/245 |
| 4,455,602 | A | * | 6/1984 | Baxter, III | .............. G06F 13/18 |
| | | | | | 710/39 |

(Continued)

OTHER PUBLICATIONS

Prud'hommeaux, E., et al., "SPARQL Query Language for RDF", Oct. 2006, pp. 1-98. Web Url. http://www.w3.org/TR/2006/WD-rdf-sparql-query-20061004/.

(Continued)

*Primary Examiner* — Anh Ly
(74) *Attorney, Agent, or Firm* — Fleit Intellectual Property Law; Thomas S. Grzesik

(57) ABSTRACT

Various embodiments provide access control to unprotected data storage system endpoints. In one embodiment, an authenticated query request is received. The request includes a query associated with an unprotected data storage system endpoint configured to execute queries anonymously. The query is written in a Resource Description Framework (RDF) query language and requests one or more datasets stored in a relational data storage system. A user parameter within the query is identified. The user parameter uniquely identifies a user requesting the query. The query is automatically rewritten to include a set of access control list properties for one or more subject variables in the query. Each of the set of access control list properties configures the query to return data from the one or more datasets for which the user is authorized to access.

20 Claims, 9 Drawing Sheets

Related U.S. Application Data continuation of application No. 14/468,415, filed on Aug. 26, 2014, now Pat. No. 9,690,792.

(51) Int. Cl.

| | | |
|---|---|---|
| *G06F 16/14* | (2019.01) | |
| *G06F 16/176* | (2019.01) | |
| *G06F 16/245* | (2019.01) | |
| *G06F 16/248* | (2019.01) | |
| *G06F 21/85* | (2013.01) | |
| *G06F 16/2453* | (2019.01) | |
| *G06F 21/62* | (2013.01) | |
| *H04L 29/06* | (2006.01) | |

(52) U.S. Cl.
CPC .......... *G06F 16/245* (2019.01); *G06F 16/248* (2019.01); *G06F 16/24534* (2019.01); *G06F 21/6218* (2013.01); *G06F 21/85* (2013.01); *H04L 63/101* (2013.01); *G06F 2221/2141* (2013.01)

(58) Field of Classification Search
CPC ........ G06F 16/148; G06F 16/00; G06F 21/85; G06F 21/6218; G06F 2221/2141; G06F 17/30; G06F 17/30091; G06F 17/30165; G06F 17/30106; G06F 17/30424; G06F 17/30554; G06F 17/30297; G06F 17/30908; G06F 17/30312; H04L 63/101
See application file for complete search history.

(56) References Cited

U.S. PATENT DOCUMENTS

| | | | | |
|---|---|---|---|---|
| 4,493,027 | A * | 1/1985 | Katz ...................... | G06F 9/4484 712/228 |
| 4,525,780 | A * | 6/1985 | Bratt .............. | G01R 31/318505 711/163 |
| 8,285,748 | B2 | 10/2012 | Thomas et al. | |
| 8,301,660 | B2 | 10/2012 | Yalamanchi | |
| 2003/0028451 | A1* | 2/2003 | Ananian ............ | G06Q 30/0615 705/26.42 |
| 2004/0064692 | A1* | 4/2004 | Kahn ...................... | H04L 63/10 713/167 |
| 2004/0070678 | A1* | 4/2004 | Toyama ............. | H04N 1/00172 348/231.3 |
| 2004/0128353 | A1* | 7/2004 | Goodman ............... | H04L 51/04 709/204 |
| 2004/0128554 | A1* | 7/2004 | Maher, III .......... | H04L 61/2553 726/11 |
| 2006/0008256 | A1* | 1/2006 | Khedouri ............ | G06F 16/4387 386/234 |
| 2006/0122946 | A1* | 6/2006 | Fahrny ............... | G06Q 20/3829 705/71 |
| 2006/0143179 | A1* | 6/2006 | Draluk .................... | H04L 63/20 |
| 2009/0234799 | A1* | 9/2009 | Betawadkar-Norwood ................. | G06F 16/2471 |
| 2010/0268722 | A1* | 10/2010 | Yalamanchi ........ | G06F 16/9024 707/759 |
| 2010/0281060 | A1* | 11/2010 | Ahmed ................. | G06F 21/604 707/785 |
| 2012/0063593 | A1* | 3/2012 | Camenisch ........... | H04L 9/3073 380/44 |
| 2012/0102022 | A1* | 4/2012 | Miranker ............ | G06F 16/2452 707/713 |
| 2012/0246696 | A1* | 9/2012 | Boukobza ........... | G06F 21/6254 726/1 |
| 2012/0271854 | A1* | 10/2012 | Truong ................... | G06F 21/41 707/785 |
| 2013/0036476 | A1* | 2/2013 | Roever ................... | H04L 63/08 726/27 |
| 2013/0073573 | A1* | 3/2013 | Huang ................. | G06F 16/254 707/755 |
| 2013/0238593 | A1* | 9/2013 | Ursal .................... | G06F 16/951 707/710 |
| 2013/0318070 | A1 | 11/2013 | Wu et al. | |
| 2013/0332473 | A1 | 12/2013 | Ryman | |
| 2015/0288669 | A1 | 10/2015 | Litoiu et al. | |
| 2015/0288699 | A1* | 10/2015 | Zhou ..................... | H04L 63/101 726/4 |
| 2016/0063271 | A1 | 3/2016 | Bartlett et al. | |
| 2016/0337484 | A1* | 11/2016 | Tola .................... | H04L 12/6418 |

OTHER PUBLICATIONS

Das, S., et al., "R2RML: RDB to RDF Mapping Language", Sep. 2012, pp. 1-36. Web Url. http://www.w3.org/TR/r2rml.

W3C., "Implementations—PR transition—Implementation Report", Last modified Jul. 19, 2012, 1 page. Web Url. http://www.w3.org/2001/sw/rdb2rdf/wiki/Implementations.

D2RQ., "Accessing Relational Databases as Virtual RDF Graphs", web site visited on Aug. 18, 2014, Web Url. http://d2rq.org/.

Prud'Hommeaux, E., et al., "SPARQL 1.1 Federated Query", Mar. 2013, pp. 1-12. Web Url. http://www.w3.org/TR/sparql11-federated-query/.

Clark, K., et al., "SPARQL Protocol for RDF", Jan. 2008, pp. 1-18. Web Url. http://www.w3.org/TR/rdf-sparql-protocol/.

Rakhmawati, N. A., On the Impact of Data Distribution in Federated SPARQL Queries, 2012 IEEE Sixth International Conference on Semantic Computing, Sep. 19-21, 2012, pp. 255-260, ISBN: 978-1-4673-4433-3. DOI: 10.1109/ICSC.2012.72.

List of IBM Patents or Patent Applications to be Treated as Related.

\* cited by examiner

```
PREFIX psmc: <http://jazz.net/ns/psm/core#>
PREFIX pdlm: <http://jazz.net/ns/psm/delivery-management#>
PREFIX ridw: <http://jazz.net/ns/reporting/d2rq/clm/4.0.3/>
PREFIX dcterms: <http://purl.org/dc/terms/>

SELECT ?release ?release_name ?busneed ?busneed_name
      (ROUND(SUM(?closedStoryPoints)/SUM(?story_points)*100) AS ?story_progress )
WHERE { ?release a psmc:Release.
      ?busneed a psmc:BusinessNeed;
            psmc:targetRelease ?release;
         pdlm:implementedByChangeRequest ?pitem;
         dcterms:title ?busneed_name.
      ?release dcterms:title ?release_name
         SERVICE <http://gado.rtp.raleigh.ibm.com:9080/dwse/sparql> {
            ?pitem ridw:RIDW_VW_REQUEST_HIERARCHY ?story.
            ?story ridw:RIDW_VW_REQUEST_REQUEST_STATUS ?story_status;
                  ridw:RIDW_VW_REQUEST_STORY_POINTS ?story_points.
         }
      BIND (IF(?story_status="Closed", ?story_points, 0) AS ?closedStoryPoints)
      }
GROUP BY ?release ?release_name ?busneed ?busneed_name
```

FIG. 5

```
PREFIX psmc: <http://jazz.net/ns/psm/core#>
PREFIX pdlm: <http://jazz.net/ns/psm/delivery-management#>
PREFIX ridw: <http://jazz.net/ns/reporting/d2rq/clm/4.0.3/>
PREFIX dcterms: <http://purl.org/dc/terms/>

SELECT ?release ?release_name ?busneed ?busneed_name
       (ROUND(SUM(?closedStoryPoints)/SUM(?story_points)*100) AS ?story_progress )
WHERE { ?release a psmc:Release.
        ?busneed a psmc:BusinessNeed;
                psmc:targetRelease ?release;
        pdlm:implementedByChangeRequest ?pitem;
        dcterms:title ?busneed_name.
        ?release dcterms:title ?release_name
        SERVICE <http://gado.rtp.raleigh.ibm.com:9080/sparql?user="phaumer@us.ibm.com"> {
            ?pitem ridw:RIDW_VW_REQUEST_HIERARCHY ?story.
            ?story ridw:RIDW_VW_REQUEST_REQUEST_STATUS ?story_status;
                ridw:RIDW_VW_REQUEST_STORY_POINTS ?story_points.
        }
        BIND (IF(?story_status="Closed", ?story_points, 0) AS ?closedStoryPoints)
}
GROUP BY ?release ?release_name ?busneed ?busneed_name
```

FIG. 6

```
SELECT *
WHERE { <https://gado.rtp.raleigh.ibm.com:9443/ccm/resource/itemName/com.ibm.team.workitem.WorkItem/144>
<http://www.w3.org/1999/02/22-rdf-syntax-ns#type> <http://jazz.net/ns/reporting/dwse#RIDW_VW_REQUEST> .
702 ⟶ <https://gado.rtp.raleigh.ibm.com:9443/ccm/resource/itemName/com.ibm.team.workitem.WorkItem/144>
<http://jazz.net/ns/reporting/dwse#RIDW_VW_REQUEST_ACCESS_LIST> "rtcadmin@gado.ibm.com" .
<https://gado.rtp.raleigh.ibm.com:9443/ccm/resource/itemName/com.ibm.team.workitem.WorkItem/144>
<http://jazz.net/ns/reporting/dwse#RIDW_VW_REQUEST_HIERARCHY> ?story .
?story <http://www.w3.org/1999/02/22-rdf-syntax-ns#type> <http://jazz.net/ns/reporting/dwse#RIDW_VW_REQUEST> .
706 ⟶ ?story <http://jazz.net/ns/reporting/dwse#RIDW_VW_REQUEST_ACCESS_LIST> "rtcadmin@gado.ibm.com" .
?story <http://jazz.net/ns/reporting/dwse#RIDW_VW_REQUEST_REQUEST_STATUS> ?story_status .
?story <http://jazz.net/ns/reporting/dwse#RIDW_VW_REQUEST_STORY_POINTS> ?story_points }
```

FIG. 7

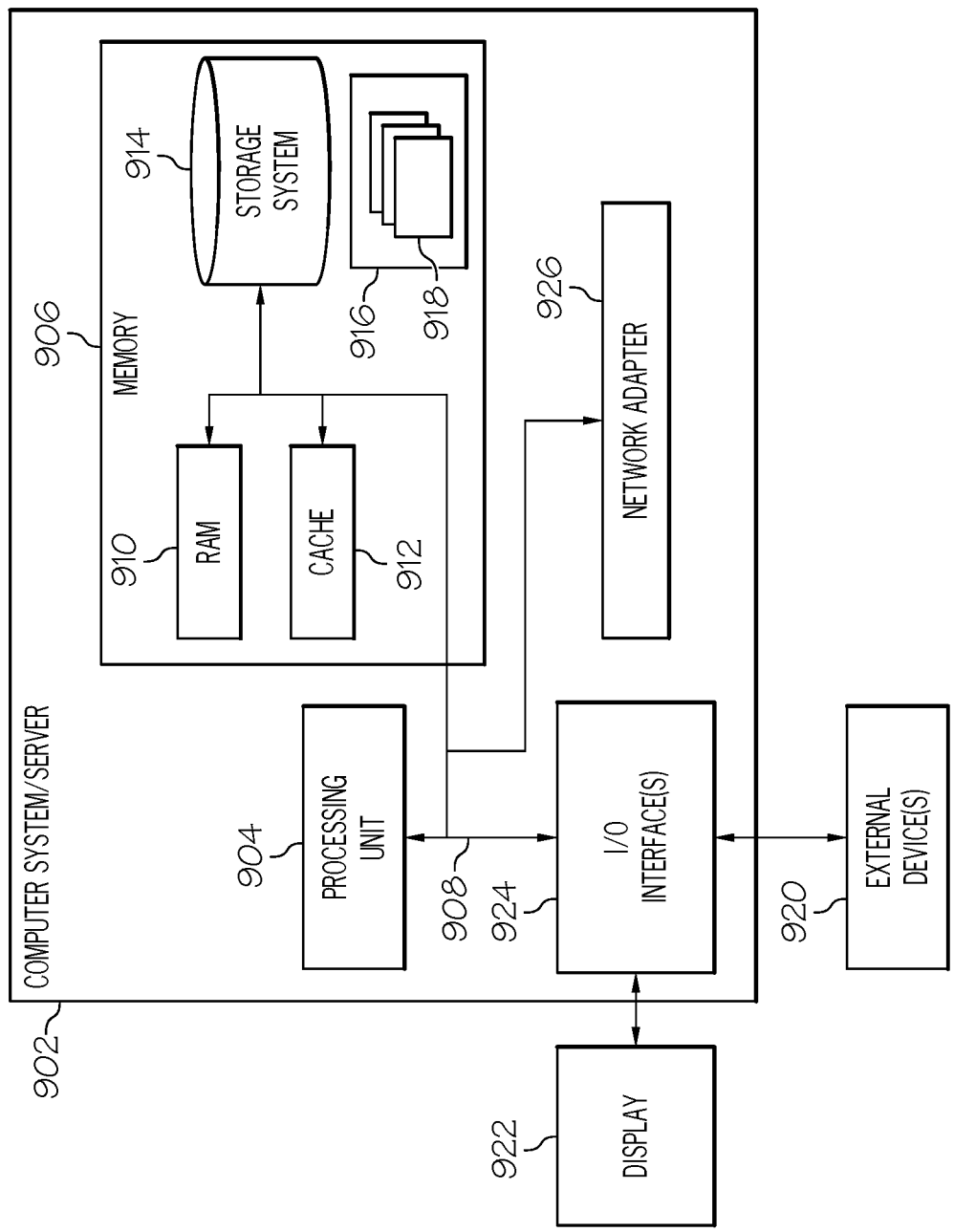

US 10,838,916 B2

ACCESS CONTROL FOR UNPROTECTED DATA STORAGE SYSTEM ENDPOINTS

BACKGROUND

The present disclosure generally relates to data retrieval systems, and more particularly relates to access control layers for unprotected data storage system endpoints.

Relational Database (RDB) to Resource Description Framework (RDF) SPARQL endpoints are server-based applications that provide access to relational databases that can be queried using the SPARQL query language. Clients send SPARQL queries to these endpoints, and the endpoints translate the SPARQL Queries to SQL queries. The endpoints execute the queries and transform the results to an RDF result format that is returned to the client.

BRIEF SUMMARY

In one embodiment, a method for providing access control to unprotected data storage system endpoints is disclosed. The method comprises receiving an authenticated query request. The request comprises a query associated with an unprotected data storage system endpoint configured to execute queries anonymously. The query is written in a Resource Description Framework (RDF) query language and requests one or more datasets stored in a relational data storage system. A user parameter within the query is identified. The user parameter uniquely identifies a user requesting the query. The query is automatically rewritten to include a set of access control list properties for one or more subject variables in the query. Each of the set of access control list properties configures the query to return data from the one or more datasets for which the user is authorized to access.

In another embodiment, an information processing system for providing access control to unprotected data storage system endpoints is disclosed. The information processing system comprises a memory and a processor communicatively coupled to the memory. An access control manager is communicatively coupled to the memory and the process. The access control manager is configured to perform a method. The method comprises receiving an authenticated query request. The request comprises a query associated with an unprotected data storage system endpoint configured to execute queries anonymously. The query is written in a Resource Description Framework (RDF) query language and requests one or more datasets stored in a relational data storage system. A user parameter within the query is identified. The user parameter uniquely identifies a user requesting the query. The query is automatically rewritten to include a set of access control list properties for one or more subject variables in the query. Each of the set of access control list properties configures the query to return data from the one or more datasets for which the user is authorized to access.

In yet another embodiment, a computer program product for providing access control to unprotected data storage system endpoints is disclosed. The computer program product comprises a storage medium readable by a processing circuit and storing instructions for execution by the processing circuit for performing a method. The method comprises receiving an authenticated query request. The request comprises a query associated with an unprotected data storage system endpoint configured to execute queries anonymously. The query is written in a Resource Description Framework (RDF) query language and requests one or more datasets stored in a relational data storage system. A user parameter within the query is identified. The user parameter uniquely identifies a user requesting the query. The query is automatically rewritten to include a set of access control list properties for one or more subject variables in the query. Each of the set of access control list properties configures the query to return data from the one or more datasets for which the user is authorized to access.

BRIEF DESCRIPTION OF THE SEVERAL VIEWS OF THE DRAWINGS

The accompanying figures where like reference numerals refer to identical or functionally similar elements throughout the separate views, and which together with the detailed description below are incorporated in and form part of the specification, serve to further illustrate various embodiments and to explain various principles and advantages all in accordance with the present disclosure, in which:

FIG. 5 shows another example of a federated query according to one embodiment of the present disclosure;

FIG. 6 shows one example of a federated query in FIG. 5 after it has been rewritten to include a user parameter associated with a user requesting the query according to one embodiment of the present disclosure;

FIG. 7 shows the one example of a portion of a federated query after it has been rewritten and translated to SQL to include joins to access list tables, filtering rows with a user identifier included within the query in a previous rewriting operation according to one embodiment of the present disclosure;

FIG. 9 is a block diagram illustrating one example of an information processing system according to one embodiment of the present disclosure.

DETAILED DESCRIPTION

RDB-to-RDF SPARQL endpoints typically use a mapping file that describes how the relational tables shall be represented as RDF. SPARQL Endpoints are often realized as web-based servers that allow anonymous access and, therefore, allow end users to see all available data that was described in the mapping file. Particularly, when access control is realized by specific rules defined on data stored in the relational database it is difficult to provide a general transparent access control mechanism that works against any query and does not rely on the query itself to conform to and implement the access control rules (i.e. perform adequate filtering itself). In such cases, end users can easily circumvent the access control and see data that they are not supposed to see.

Therefore, one or more embodiments, allow for transparent filtration of the results of queries submitted by an end user. Query results only comprise the data that the user is allowed to see. In one embodiment, the realized access control rule assumes that all data in the relational database is allocated to some form of container (e.g., project areas) and that access is regulated via these containers. In other words, a user's access or lack thereof is defined by whether they are allowed to see the data of a specific container requested by a query. One or more embodiments do not require any modification of SPARQL Endpoints and works with unmodified existing endpoints (such as out-of-the-box D2RQ servers (D2RQ is an open source project for accessing relational databases as virtual, read-only RDF graphs)). These embodiments restrict access to the server and provide at least two front-end applications that wrap its access and perform authentication as well as perform query rewrites to realize access control transparently. In addition, at least one embodiment supports federated queries where a federated SPARQL endpoint cannot be called via an authentication mechanism but requires being open and anonymously accessible. In this embodiment, access control is provided and the access right of the calling user is still recognized despite the data having been requested anonymously via a federated query call.

Operating Environment

Figure 1:
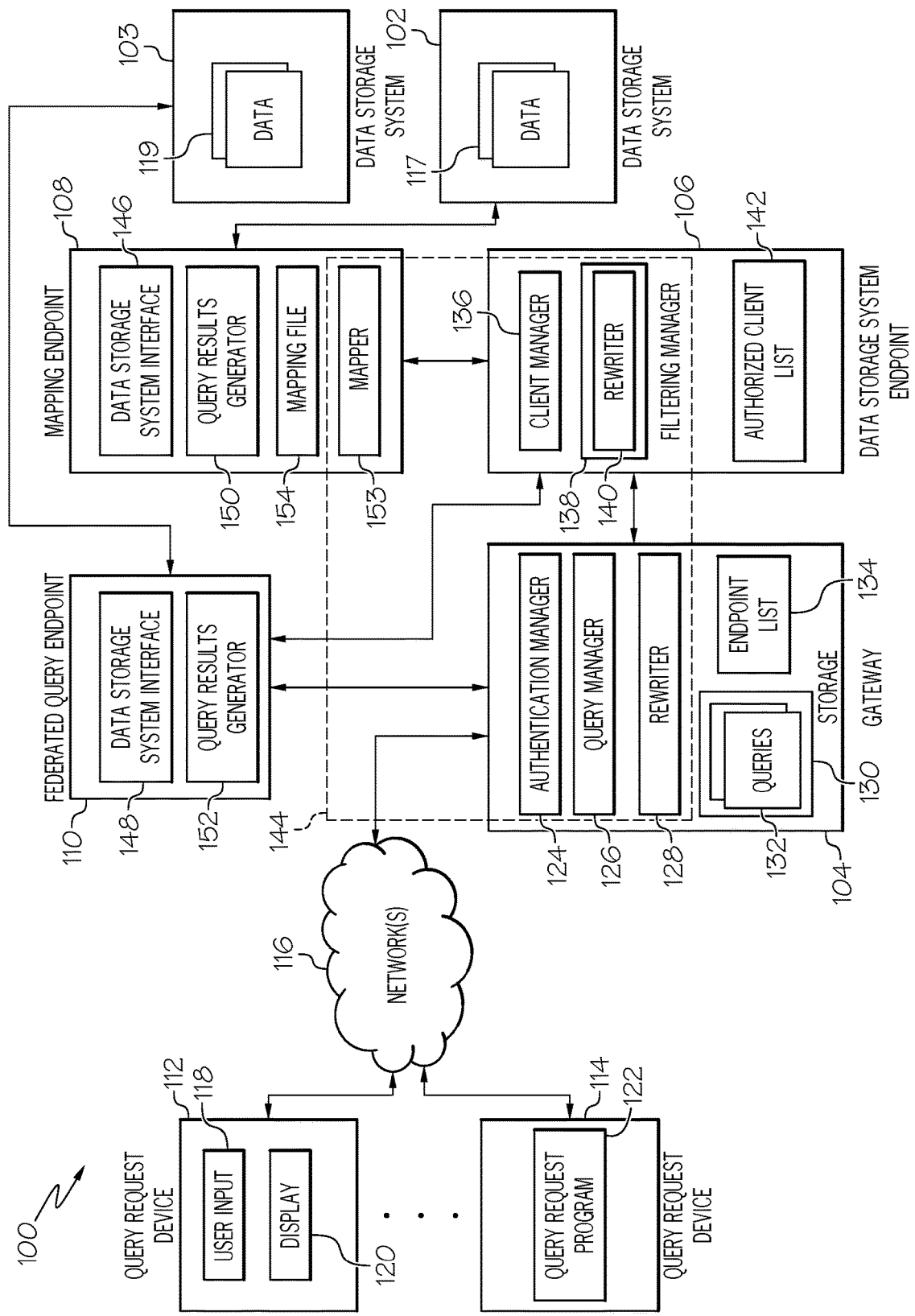
FIG. 1 is a block diagram illustrating one example of an operating environment according to one embodiment of the present disclosure.

FIG. 1 shows one example of an operating environment 100 for providing an access control layer to unprotected data storage system endpoints. In the example shown in FIG. 1, the operating environment 100 comprises a plurality of information processing systems comprising data storage systems 102, 103 (e.g., database(s); data warehouse(s), and/or the like); a gateway 104; data storage system endpoints 106, 108, 110; and query request devices 112, 114. One or more of these information processing systems 102 to 114 can reside within a cloud computing environment and/or a non-cloud computing environment. Each of the information processing systems 102 to 114 is communicatively coupled to one or more networks 116 comprising connections such as wire, wireless communication links, and/or fiber optic cables.

At least one of the data storage systems 102 maintains data 117 in a relational format, while at least one of the other data storage systems 103 maintains data 119 in a Resource Description Framework (RDF) format. A query request device 112 is a user device comprising user input 118 and a display 120. Examples of user devices include personal desktop computers, laptops, mobile computing devices such as personal data assistants, tablet computers, smartphones, or any other device capable of receiving a user input, converting the user input to a digital signal in the form of a query request, and transmitting the query request to the gateway 104. In one embodiment, the user device is configured to provide a web user interface which can be displayed on the display 120 and with which the user can interact via the user input 118. The can configure the gateway 104 with the web user interface.

Another example of a query request device is a computer 114 that generates a query request as a result of an operation of a query request program 122, and not based on a user input. The computer 114 can include a processor, memory, and a data interface to interface with the gateway 104. The query request program 122 can be a software program stored in memory and executed by the processor to generate a query request at a certain time and having a pre-programmed query object. In other words, a query request can be generated based on a user input from a user device 112, or automatically in the process of an executing program being executed by a computer 114. In one embodiment, the computer 114 uses a REST application programming interface (API) to configure the gateway 104.

In one or more embodiments, the user device 112, computer 114, and reporting engines (not shown) can be part of the same device or be separate devices. For example, the computer 114 may not represent a separate device from the user device 112, but rather that the computer 114 generates the query request without use of the user device 112. The query request can be generated using software or hardware corresponding to reporting engines. For example, a user can open a program utilizing a reporting engine on a computer and can use the user device 112 to generate a query in the program utilizing the reporting engine. Reporting engines include report generators configured to generate reports. In particular, reporting engines are configured to receive raw data and organize the raw data into a predetermined reporting format for storage, display, printing, or performing any other process. The report may be, for example, an html file, a pdf file, word processing document, image document, any other electronically storable file, or any displayable file.

The gateway 104 comprises an authentication manager 124, a query manager 126, a query rewriter 128, local storage 130 comprising queries 132, and an endpoint list 134. Each of these components is discussed in greater detail below. In one embodiment, the gateway 104 is a SPARQL (an RDF query language) gateway that enables reporting on Linked Data sources. Linked Data utilizes Resource Description Framework (RDF) as the data mode for describing resources. The first data storage system endpoint 106 (herein referred to as "DSSE 106" or "access control endpoint 106") comprises a client manager 136, a filtering manager 138 comprising a query rewriter 140, and an authorized client/service list 142. Each of these components is discussed in greater detail below.

The second data storage system endpoint 108 (herein referred to as the "RDB-to-RDF mapping endpoint 108" or "mapping endpoint 108") and the federated query endpoint (FQE) 110 each comprises a data storage system interface 146, 148, a query results generator 150, 152, and a mapper 153. The mapper 153 obtains a mapping file 154, which relates data 158 of a non-RDF database 156 to RDF vocabularies. For example, the mapping file 154 comprises a mapping of tables and columns in a relational database to rdf:Type and rdf:Property classes. The mapping defines a virtual RDF graph comprising information from the database 156. One example of a mapping language is the D2RQ mapping language. However, other mapping languages are applicable as well.

In one embodiment, the mapping file 154 maps relational tables to RDF resource types to include an access list property. This property, when queried, returns each user that is allowed to view/access the associated resource. The access list property, in one embodiment, is added to the mapping file 154 for each table that is associated with a project container, i.e. every table in the relational schema that has a foreign key to the project table gets the property added in the mapping file. The access list property, in one embodiment, is populated by joining with the project container's resource lookup table. This resource lookup table as all the other data is stored in the relational database. The join provides the list of users that are part of the project and, therefore, are allowed to see the data of the mapped table.

With respect to access control, the access list property is used as a filter (i.e. show only the rows in which the user is listed in the access list) and not for retrieving the user id. Stated differently, the access list property is utilized by the access control manager 144 to provide a filtering operation that only returns the resource data for which the requesting user is authorized to view/access.

In one embodiment, an access control manager 144 is distributed across the gateway 104, the DSSE 106, and the mapping endpoint 108. The access control manager 144 comprises the authentication manager 124, query manager 126, query rewriter 128, client manager 136, filtering manager 138, query rewriter 140, mapper 153, and mapping file 154. The access control manager 144 is discussed in greater detail below. It should be noted that although FIG. 1 shows the gateway 104, DSSE 106, mapping endpoint 108, and the federated query endpoint 110 as residing on separate information processing systems, two or more of these entities can reside on a single information processing system as well. Also, in at least one embodiment, one or more of the endpoints 106, 108, 110 are SPARQL endpoints that allow agents/users (human or machine) to query the data storage systems 102, 103 via the SPARQL language.

In one or more embodiments, the mapping endpoint 108 is unprotected such that all agents are able to anonymously access all data 117 within the data storage system 102. Therefore, this endpoint 108 generally cannot be called by requesting devices 112, 114 via authentication mechanisms. However, the access control manager 144 provides transparent access control with respect to the data 117 stored in the data storage system 102 such that the query author is not required to encode access control rules in his/her queries. In addition, the access control manager 144 allows for access control to be implemented within the operating environment 100 without directly modifying the mapping endpoint 108. Even further, the access control manager 144 enables the mapping endpoint 108 to be accessed anonymously while still applying access control rules, i.e., without authentication as it needs to be usable for federated queries in which calling the endpoint 108 via a SPARQL Query's SERVICE statement may not support the required authentication protocol.

Access Control for Unprotected Data Storage Endpoints

In one embodiment, the gateway 104 that maintains a list of queries 132 that are allowed to be executed against the data storage system 102. The gateway 104 also maintains a list 134 of endpoints against which the queries 132 can be executed, where for each endpoint in the list 134 a set of information is provided that indicates whether or not the endpoint supports the access control provided by the access control manager 144. The authentication manager 124 at the gateway 104 authenticates the agent (e.g. using Basic Auth or Oauth) to allow the agent to run any of the queries 132. If a query 132 is to be executed against an endpoint that is marked for access control, the query rewriter 128 updates the outgoing query to include a user/agent parameter such as a user identifier (e.g., email address) that is known in the data storage system 102 for access control as a regular URL parameter for the query request. In one embodiment, the user parameter is obtained from the authentication process between the agent and the gateway 104.

The access control manager 144 restricts access to the mapping endpoint 108 by directing the outgoing query from the gateway 104 to the DSSE 106. In one embodiment, the DSSE 106 wraps the RDB-to-RDF mapping endpoint 108 because trusted clients are allowed to connect to the mapping endpoint 108 anonymously. Stated differently, by having the DSSE 106 wrap the mapping endpoint 108 only the DSSE 106 is able to access the mapping endpoint 108. For example, the DSSE 106 maintains an authorized client/service list 142 (e.g., a whitelist) indicating which clients/services are authorized to connect to the RDB-to-RDF mapping endpoint 108 anonymously. This allows the mapping endpoint 108 to participate in federated SPARQL queries that require anonymous access. For example, when the DSSE 106 receives a query request from the gateway 104 or federated query endpoint 110, the client manager 136 checks the authorized client list 142 to determine if the gateway 104 or endpoint 110 is one of the authorized servers/clients in the list 142. In one non-limiting example, the client manager 136 compares the Internet Protocol (IP) address of the gateway 104 or endpoint 110 to the authorized client list 142, which comprises authorized IP addresses.

If the gateway 104 is included within the authorized client list 142, the client manager 136 determines that the agent associated with the query 104 sent from the gateway 104 is authorized to connect to the mapping endpoint 108 anonymously. The client manager 136 also determines that this agent has authenticated successfully against the gateway 104 and that the user parameter has not been faked by another agent. All incoming anonymous requests from the whitelisted clients are processed and redirected to the mapping endpoint 108. For example, the filtering manager 138 (via the query rewriter 140) at the DSSE 106 rewrites the incoming query by adding an access list property from the mapping file 154 and the user parameter to all query variables. In one embodiment, if every subject variable of the SPARQL query is not associated with a resource from the mapping file 154 defining an rdf:type property as part of the query's WHERE statement, the query request is denied since it is likely not possible to determine the access for such a resource. In all other cases, once the filtering manager 138 has rewritten the query, the query is sent to the mapping endpoint 108, which executes the query and obtains filtered results based on the access list properties and user parameter within the query. The filtered query results are then returned to the query requesting device 112, 114 via the gateway 104 or the federated query endpoint 110.

Figure 2:
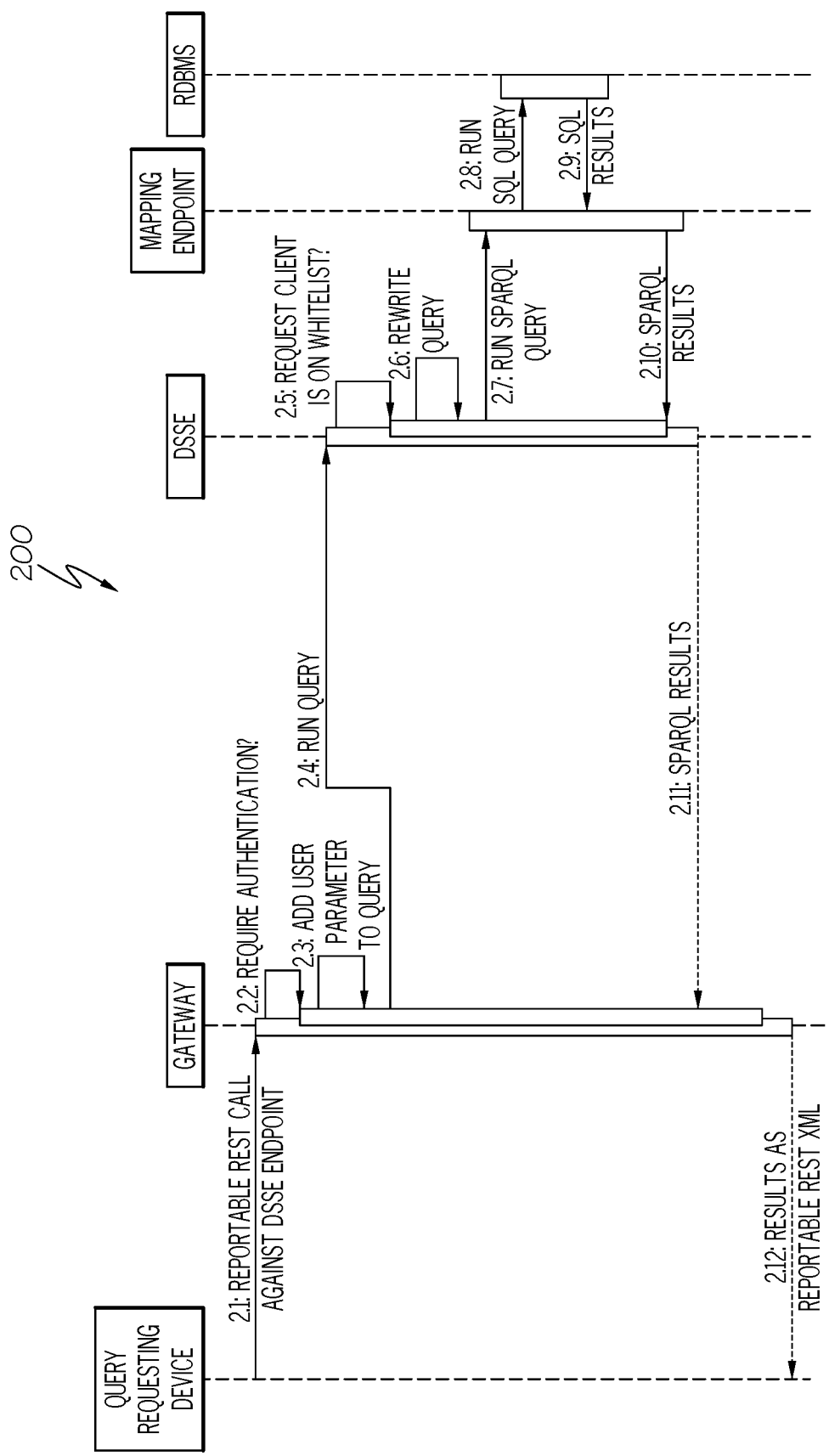
FIG. 2 is a sequence diagram for providing access control to an unprotected data storage system endpoint directly called by a query according to one embodiment of the present invention.
Figure 3:
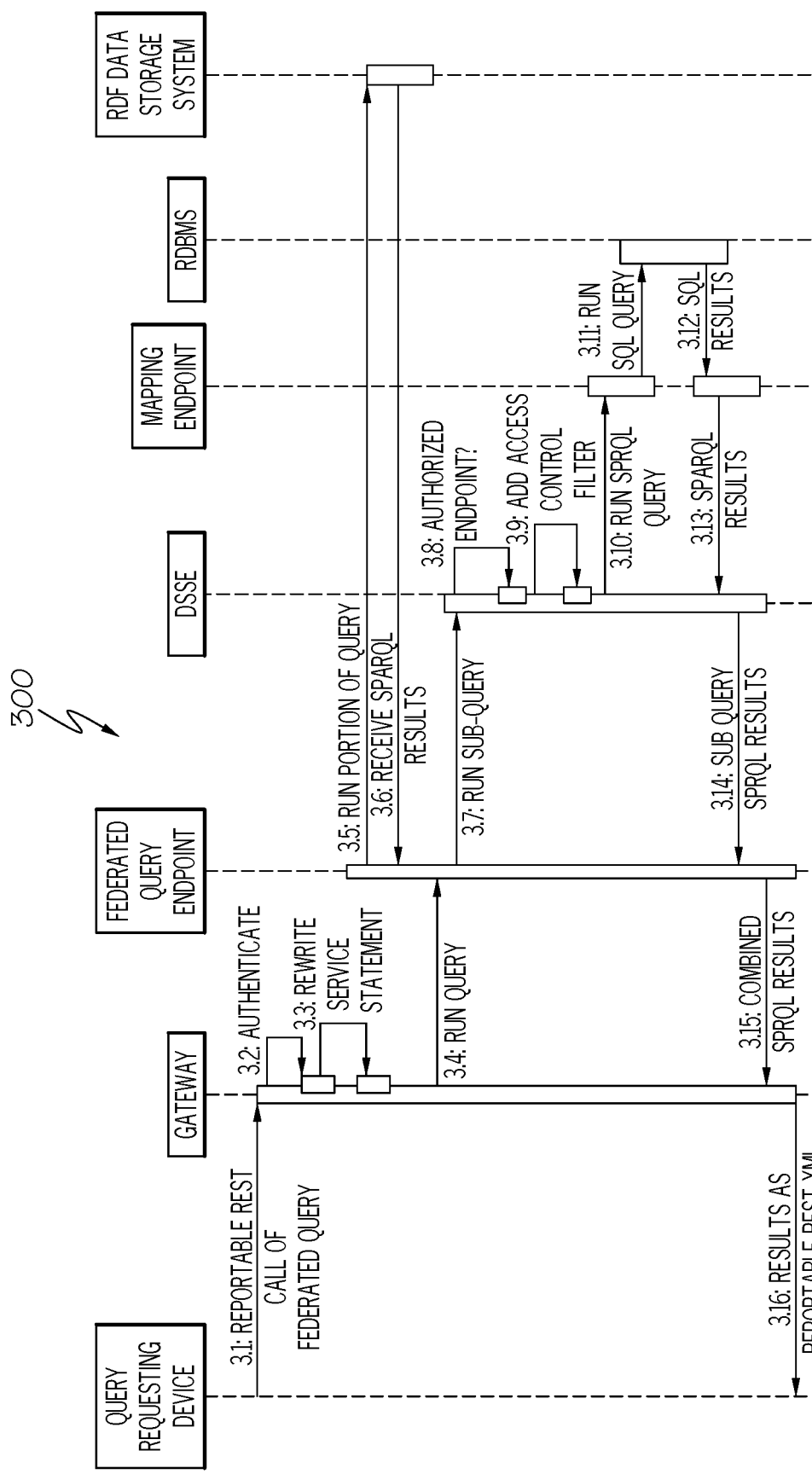
FIG. 3 is a sequence diagram for providing access control to an unprotected data storage system endpoint indirectly called by a federated query according to one embodiment of the present invention.

FIGS. 2 and 3 show Unified Modeling Language (UML) sequence diagrams for the interactions discussed above. In particular, FIG. 2 is a sequence diagram 200 for executing a direct query and FIG. 3 is a sequence diagram 300 for executing federated queries according to one or more embodiments of the present disclosure. In FIG. 2, a query requesting device 112, 114 such as a report running in a dashboard requests the execution of a particular query 132 that has been stored on the gateway 134 via a REST call at T2.1. The REST call specifies the identifier of the query 132 as well as the protocol to be used (e.g. Reportable REST XML or SPARQL Results). In the example of FIG. 2, the query requesting device 112, 114 issues a reportable REST call directly against the DSSE 106 and the query is an RDF-based query (e.g., a SPARQL query). If authentication is required by the called endpoint 106 the query requesting device 112, 114 authenticates with the gateway 104 (e.g. using Basic Auth or Oauth) and the gateway 104 receives the authenticated request to execute the query, at T2.2.

The query manager 126 at the gateway 104 checks the query to see if the query runs directly against the registered endpoint for the DSSE 106 or if the query runs against the registered endpoint for FQE 110 and includes a SERVICE statement against a URL that matches any of the registered endpoints for the DSSE 106 in the endpoint list 134. In the example shown in FIG. 2, the query manager 126 determines that the query 132 is to be executed directly against the DSSE 106. Therefore, the query rewriter 128 modifies the query by adding a user parameter associated with the requesting agent, at T2.3. In one embodiment, the query rewriter 128 modifies the call to the DSSE 106 within the query to include a unique identifier such as the user login (e.g., email address) for the gateway 104. For example, consider the following SPARQL endpoint call from a query " . . . SERVICE <http://server.com/sparql". The query rewriter 128 modifies this call to include a unique user identifier associated with the agent: as follows " . . . SERVICE <http://server.com/sparql?user="phaumer@us.ibm.com"> . . . ".

Once the query has been rewritten, the query manager 126 sends the query to the DSSE 106, at T2.4. The DSSE 106 receives the query, and the client manager 136 compares an identifier associated with the gateway 104 to the authorized client/service list 142, at T2.5. If the client manager 136 determines that the gateway 104 is an authorized client, the filtering manager 138 (via the query rewriter 140) rewrites the query a second time, at T2.6. In one embodiment, the filtering manager 138 rewrites the query to include an access list property from the mapping file 154 and the received user parameter to all query variables. This rewriting filters the query results such that only data that the agent is allowed to access is returned.

Figure 4:
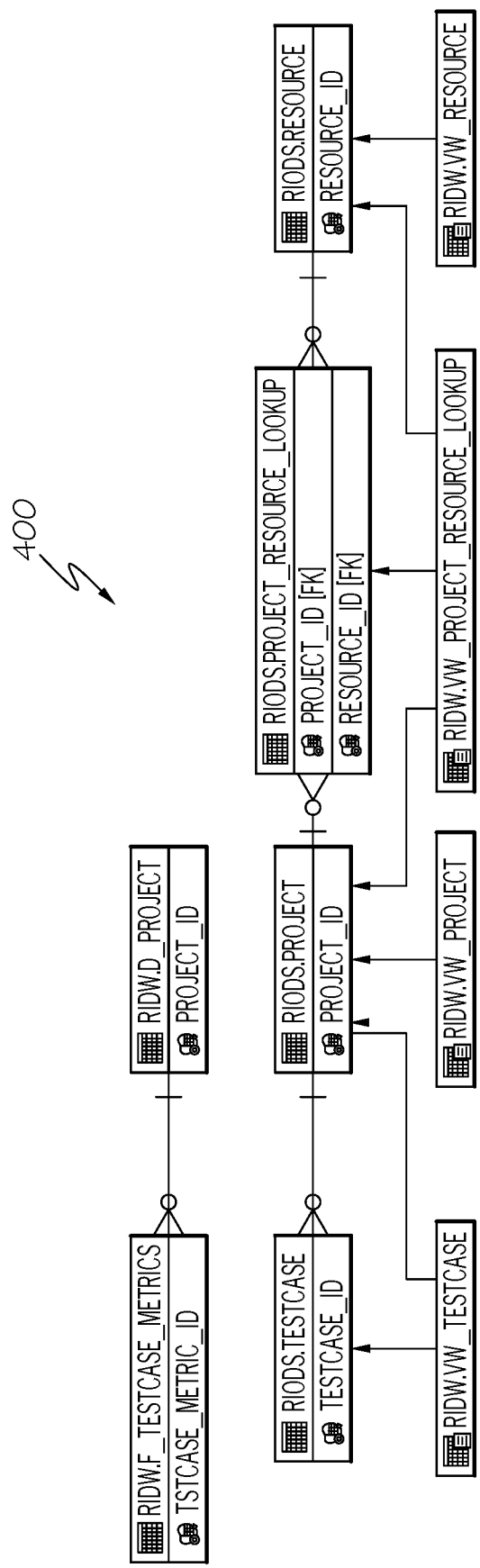
FIG. 4 shows one example of relational database schema according to one embodiment of the present disclosure.

For example, consider the relational database schema 400 shown in FIG. 4. Queries on operational data in the data storage system 102 are written against views matching tables. These views expose only the data columns available to end users/agents and provide convenient joins to related tables to simplify query writing. For example, the view RIDW.VW_TESTCASE provides access to the RIODS.T-ESTCASE table. Any SQL query on a view such as VW_TESTCASE needs to join with tables that provide the access control filter to ensure the access control rule that an agent can only see the data of containers in which they are declared members. In the example shown in FIG. 4 the containers are expressed via the PROJECT table and view. The PROJECT_RESOURCE_LOOKUP provides the information of which agents (RESOURCE) are members of which PROJECT. Therefore, a query on TESTCASE needs to join with these tables and filter the results to only the test case results of projects in which the agent is a member. Also, any SPARQL query that is translated to a SQL query that accesses tables such as TESTCASE, which are associated with a PROJECT table are joined with these tables for filtering.

The invention provides a special RDF to SPARQL mapping generator that adds for all views on tables that have a PROJECT reference a special ACCESS_LIST property that can be used to define such an access control filter directly in the SPARQL query. The translation to SQL will then provide the SQL joins described above.

SPARQL queries such as:

```
SELECT ?s
WHERE {?s rdf:type ridw:RIDW_VW_TESTCASE.}
``` that retrieve all test cases are rewritten automatically by the filtering manager 138 at the DSSE 106 such that the query only returns the resources that the agent running the query is allowed to see. For example, the above query is automatically rewritten as follows:

```
SELECT ?s
WHERE {?s rdf:type ridw:RIDW_VW_TESTCASE;
       ridw:RIDW_VW_TESTCASE_ACCESS_LIST
       "phaumer@us.ibm.com"}.
```

This query utilizes the ACCESS_LIST property indicating that only resources that have the agent with this email address on their access list shall be returned.

The property <class resource name>_ACCESS_LIST for the RIDW_VW_TESTCASE case view used above is defined in the mapping file 154 as follows:

```
map:RIDW_VW_TESTCASE_access a d2rq:PropertyBridge;
    d2rq:belongsToClassMap map:RIDW_VW_TESTCASE;
    d2rq:property ridw:RIDW_VW_TESTCASE_ACCESS_LIST;
    d2rq:column "RIDW.VW_RESOURCE.REFERENCE_ID";
    d2rq:join "RIDW.VW_TESTCASE.PROJECT_ID <=
        RIDW.-
        VW_PROJECT_RESOURCE_LOOKUP.-
        PROJECT_ID";
    d2rq:join
    "RIDW.VW_PROJECT_RESOURCE_LOOKUP.-
    RESOURCE_ID =>
        RIDW.VW_RESOURCE.RESOURCE_ID";
    d2rq:propertyDefinitionLabel "Email addresses of agents with
    access";
```

The above mapping defines the relational join from the resource's project id over the lookup table to the list of resources associated with that project. It should be noted that embodiments of the present disclosure are not limited to a D2RQ mapping and other mapping mechanisms are applicable as well. As can be seen from the above example, the definition of the property only accesses the views of the RIDW schema, which in turn are based on tables that provide the respective foreign key constraints. Observe that the access list property also uniquely binds the subject variable to the database table in the same way as the rdf:type statement does. Therefore, the rdf:type statement can left out (i.e., removed) as part of the query rewrite to improve performance of the rewritten query. Hence, the final rewritten query is as follows:

```
SELECT ?s
WHERE {?s ridw:RIDW_VW_TESTCASE_ACCESS_LIST
       "phaumer@us.ibm.com"}.
```

Using this new access list property, the filtering manager 138 rewrites queries that include the user parameter value bindings for all resources/table that are access controlled. In particular, the filtering manager 138 finds all the query's subject variables. The filtering manager 138 determines if each subject variable in the query has an rdf:type assignment in the WHERE graph of the mapping file 154. If not, the query is rejected with an error. If the query has (nested) optional sections then the filtering manager 138 ensures that the rdf:type assignment of that variable is in the same or parent OPTIONAL group than the first use of the variable otherwise. If not, the query is rejected with an error. The filtering manager 138 consults the mapping file 154 for every subject variable (with a valid rdf:type) to see if the rdf:type maps to a relational table with a PROJECT_ID column and, therefore, defines an ACCESS_LIST property. If no such property was defined then the table/resource is not access controlled and can be freely accessed by every agent. If such a property can be found and there was no user parameter included in the query request then the request returns an error. If the access list property was found and the user parameter is available then the filtering manager 138 adds a binding of that user parameter to the access list property of that resource. The filtering manager 138 replaces the rdf:type statement with this new binding. In case of the rdf:type being part of an OPTIONAL group, the filtering manager 138 places the access list statement in the same OPTIONAL section as the first usage of the variable.

A different query that was rewritten using the above process comprises the following form:

```
SELECT ?date (SUM(?n) AS ?sum_total_tc)
WHERE {?s ridw:RIDW_F_TESTCASE_METRICS_ACCESS_LIST
          "phaumer@us.ibm.com";
ridw:RIDW_F_TESTCASE_METRICS_TOTAL_TESTCASES ?n;
ridw:RIDW_F_TESTCASE_METRICS_DATE_ID ?date_id.
?date_id rdf:type ridw:RIDW_D_DATE;
ridw:RIDW_D_DATE_PERIOD_START_DATE ?date.
       }
GROUP BY ?date
```

As can be seen, the dimension table D_DATE is not access controlled and, therefore, no ACCESS_LIST property was added. The table F_TESTCASE_METRICS is access controlled and, therefore, the ACCESS_LIST property was added replacing a formerly present occurrence of an rdf:type statement in the query.

Returning to FIG. 2, the DSSE 106 passes the rewritten query to the mapping endpoint 108, at T2.7. The data storage system interface 146 at the mapping endpoint 108 translates the RDF-based query into an SQL query, and queries the data storage system 102 based on the search terms, access control list properties, and user parameter in the query, at T2.8. The data storage system 102 returns the query results to the mapping endpoint 108, at T2.9. In one embodiment, the query results are in a Structured Query Language (SQL) results format. In this embodiment, the query results generator 150 at the mapping endpoint 108 transforms the SQL-based query results into an RDF-based query language format (e.g., SPARQL). The mapping endpoint 108 then transmits the transformed query results to the DSSE 106, at T2.10. The DSSE 106 transmits the received query results to the gateway 104, at T2.11, which returns the query results to the query requesting device 112, 114, at T2.12

In FIG. 3, a query requesting device 112, 114 such as a report running in a dashboard requests the execution of a particular query 132 that has been stored on the gateway 134 via a REST call at T3.1. The REST call specifies the identifier of the query 132 as well as the protocol to be used (e.g. Reportable REST or SPARQL Results). In the example of FIG. 3, the query requesting device 112, 114 issues a reportable REST call of a federated query against the federated query endpoint 110. If authentication is required by the called endpoint 106 the query requesting device 112, 114 authenticates with the gateway 104 (e.g. using Basic Auth or Oauth) and the gateway 104 receives the authenticated request to execute the query, at T3.2.

The query manager 126 at the gateway 104 checks the query to see if the query runs directly against the DSSE 106 endpoint or if the query runs against the FQE 110 endpoint and includes a SERVICE statement against a URL that matches any of the endpoints in the endpoint list 134. In the example of FIG. 3, the query manager 126 determines that the query is defined against an endpoint without access control (e.g., the federated query endpoint 110), but includes one or more SERVICE statements that federate a call to the access controlled DSSE 106. In other words, the DSSE 106 is accessed indirectly via a federated query performed by the federated query endpoint 110. Therefore, the query rewriter 128 modifies the query by rewriting the SERVICE statement (s) to include a user parameter associated with the requesting agent in the request URL as a parameter, at T3.3. For example, consider the query 500 shown in FIG. 5. This query 500 comprises a SERVICE statement 502 with a URL 504 matching the DSSE 106. The query rewriter 128 modifies this query 500 by rewriting the SERVICE statement 502 as shown in FIG. 6. In particular, FIG. 6 shows that the SERVICE statement 502 has been modified to include a user parameter 606 (e.g., an email address that uniquely identifies the agent) associated with the requesting agent in the request URL 504 as a parameter.

Once the query has been rewritten, the query manager 126 sends the query to the federated query endpoint 110 at T3.4. The federated query endpoint 110 receives the query, and its data storage system interface 148 executes a portion of the query against an RDF-based data storage system 103, at T3.5. Query results are then returned to the federated query endpoint 110, at T3.6. Contemporaneously (or at a different point in time) with running the portion of the query against an RDF-based data storage system 103, the federated query endpoint 110 runs one or more sub-queries that call the DSSE 106, at T3.7. The client manager 136 at the DSSE 106 compares an identifier associated with the federated query endpoint 110 to the authorized client/service list 142, at T3.8. If the client manager 136 determines that the federated query endpoint 110 is an authorized client, the filtering manager 138 (via the query rewriter 140) applies the access control rules to the query by automatically rewriting it, at T3.9. In one embodiment, the filtering manager 138 rewrites the query to include an access list property from the mapping file 154 and the received user parameter to all query variables similar to that discussed above with respect to FIGS. 4 and 5. For example, FIG. 7 shows one example of a query 700 after it has been rewritten by the filtering manager 138 to include one or more access control list properties 702, 706 based on the rewriting process discussed above.

The DSSE 106 passes the rewritten query to the mapping endpoint 108, at T3.10. The data storage system interface 146 at the mapping endpoint 108 translates the RDF-based query into an SQL query, and queries the data storage system 102 based on the search terms, access control list properties, and user parameter in the query, at T3.11. The data storage system 102 returns query results to the mapping endpoint 108, at T3.12. In one embodiment, the query results are in a Structured Query Language (SQL) results format. In this embodiment, the query results generator 150 at the mapping endpoint 108 transforms the SQL-based query results into an RDF-based query language format (e.g., SPARQL). The mapping endpoint 108 then transmits the transformed query results to the DSSE 106, at T3.13. The DSSE 106 transmits the received query results to the federated query endpoint 110 and combines both sets of query results, at T3.14. The federated query endpoint 110 the returns the combined query results to the query requesting device 112, 114, at T3.15, which returns the query results to the query requesting device 112, 114, at T3.16.

Accordingly, one or more embodiments wrap access to the mapping endpoint server 108 by providing an authentication layer on top of the endpoint 108 while still preserving the ability to call the endpoint anonymously via direct and federated queries. Clients are authenticated by the gateway 104 and allows for queries to be executed anonymously by the mapping endpoint sever 108. The DSSE 106 provides control information transparently to the mapping endpoint sever 108 by rewriting a query to include access control list properties that are bound to a unique identifier of an authenticated agent requesting the query.

Operational Flow Diagram

Figure 8:
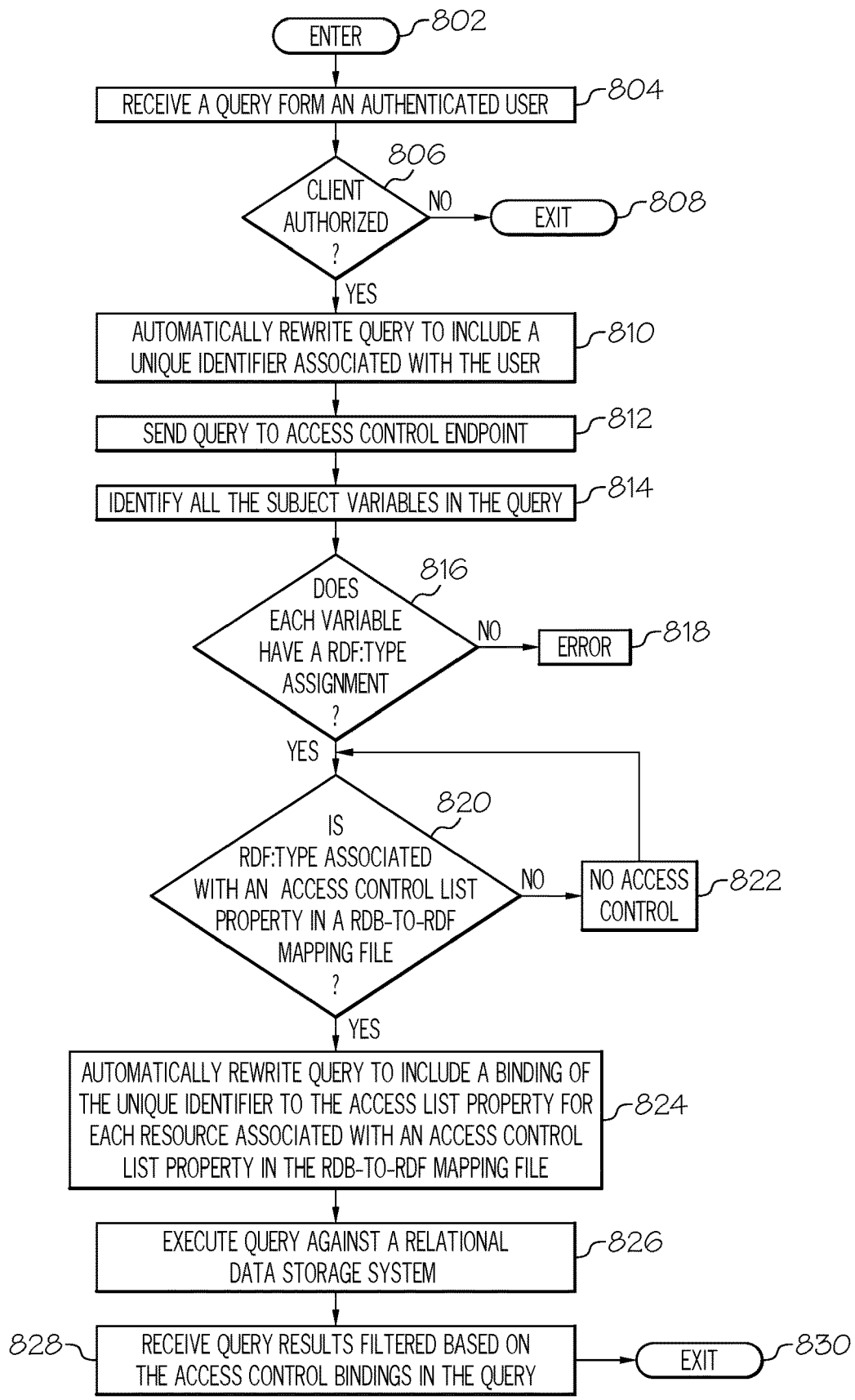
FIG. 8 is an operational flow diagram illustrating one example of a process for providing access control to unprotected data storage system endpoints according to one embodiment of the present disclosure.

FIG. 8 is an operational flow diagram illustrating one example of a process providing access control to unprotected data storage system endpoints. The operational flow diagram of FIG. 8 beings at step 802 and flows directly to step 804. A gateway 106, at step 804, receives a query from an authenticated agent. A portion of the access control manager 144 at the gateway 106, at step 806, determines if the gateway 104 (or federated query endpoint 110) is authorized to access a mapping endpoint 108 configured to execute the query against a data storage system 102. If the result of this determination is negative, the control flow exits at step 808. If the result of this determination is positive, the portion of the access control manager 144 at the gateway 106, at step 810, automatically rewrites the query to include a unique identifier associated with the agent.

The access control manager 144, at step 812, sends the rewritten query to an access control endpoint 106. The access control manager 144, at step 814, identifies all of the subject variables in the query. The access control manager 144, at step 816, determines if each variable has a rdf:TYPE assignment in the query. If the result of this determination is negative, the access control manager 144, at step 818, generates an error, which is returned to the client and the authenticated agent. If the result of this determination is positive, the access control manager 144, at step 820, determines if the identified rdf:TYPE for each variable is associated with an access control list property in an RDB-to-RDF mapping file 154. If the result of this determination is negative, the access control manager 144, at step 822, determines that access control is not required for the resource associated with the rdf:TYPE and variable. If the result of this determination is positive, the access control manager 144, at step 824, automatically rewrites the query to include a binding of the unique identifier to the access list property for each resource associated with an access control list property in the RDB-to-RDF mapping file 154. The rewritten query, at step 826, is executed against a relational data storage system 102. Query results, at step 828, that are filtered based on the access control bindings in the query are then returned. The control flow then exits at step 830.

Information Processing System

Referring now to FIG. 9, this figure is a block diagram illustrating an information processing system that can be utilized in various embodiments of the present disclosure such as the gateway 104, DSSE 106, mapping endpoint 109, or the federated query endpoint 110. The information processing system 902 is based upon a suitable processing system configured to implement one or more embodiments of the present disclosure. Any suitably configured processing system can be used as the information processing system 902 in embodiments of the present disclosure. The components of the information processing system 902 can include, but are not limited to, one or more processors or processing units 904, a system memory 906, and a bus 908 that couples various system components including the system memory 906 to the processor 904.

The bus 908 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Although not shown in FIG. 9, the main memory 906 includes at least the access control manager 144 and its components. Also, the other components of the gateway 104, DSSE 106, mapping endpoint 109, and/or the federated query endpoint 110 discussed above can also reside within the main memory 906. Each of these components can also reside within the processor 904, or be a separate hardware component. The system memory 906 can also include computer system readable media in the form of volatile memory, such as random access memory (RAM) 910 and/or cache memory 912. The information processing system 902 can further include other removable/non-removable, volatile/non-volatile computer system storage media. By way of example only, a storage system 914 can be provided for reading from and writing to a non-removable or removable, non-volatile media such as one or more solid state disks and/or magnetic media (typically called a "hard drive"). A magnetic disk drive and/or sold state drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to the bus 908 by one or more data media interfaces. The memory 906 can include at least one program product having a set of program modules that are configured to carry out the functions of an embodiment of the present disclosure.

Program/utility 916, having a set of program modules 918, may be stored in memory 906 by way of example, and not limitation, as well as an operating system, one or more application programs, other program modules, and program data. Each of the operating system, one or more application programs, other program modules, and program data or some combination thereof, may include an implementation of a networking environment. Program modules 919 generally carry out the functions and/or methodologies of embodiments of the present disclosure.

The information processing system 902 can also communicate with one or more external devices 920 such as a keyboard, a pointing device, a display 922, etc.; one or more devices that enable an agent to interact with the information processing system 902; and/or any devices (e.g., network card, modem, etc.) that enable computer system/server 902 to communicate with one or more other computing devices. Such communication can occur via I/O interfaces 924. Still yet, the information processing system 902 can communicate with one or more networks such as a local area network (LAN), a general wide area network (WAN), and/or a public network (e.g., the Internet) via network adapter 926. As depicted, the network adapter 926 communicates with the other components of information processing system 902 via the bus 908. Other hardware and/or software components can also be used in conjunction with the information processing system 902. Examples include, but are not limited to: microcode, device drivers, redundant processing units, external disk drive arrays, RAID systems, tape drives, and data archival storage systems.

Non-Limiting Examples

As will be appreciated by one skilled in the art, aspects of the present disclosure may be embodied as a system, method, or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit", "module", or "system."

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer maybe connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, with an information processing system, for providing access control to unprotected data storage system endpoints, the method comprising:
   receiving an authenticated query request comprising a query associated with an unprotected data storage system endpoint configured to execute queries anonymously;
   identifying a user parameter within the query, wherein the user parameter uniquely identifies a user requesting the query;
   automatically rewriting, based on the user parameter, the query to include a set of access control list properties for one or more subject variables in the query, wherein each of the set of access control list properties configures the query to return data from one or more datasets for which the user is authorized to access, where the one or more datasets are stored within a relational data storage system;
   executing the rewritten query against the one or more datasets stored in the relational data storage system;
   receiving, based on the executing, a set of query results comprising at least a portion of the one or more datasets, wherein the set of query results have been filtered based on the set of access control list properties and the user parameter bound to each of the set of access control list properties; and
   transmitting the set of query results to a computing device.

2. The method of claim 1, wherein the automatic rewriting of the query configures the unprotected data storage system endpoint to execute the rewritten query anonymously while protecting the one or more datasets from unauthorized access.

3. The method of claim 1, wherein identifying the user parameter and automatically rewriting the query are based on:
   identifying an information processing system from which the query request was received;
   comparing a unique identifier of the information processing system with a list of client authorized to connect to the unprotected data storage system endpoint; and
   determining, based on the comparing, that the information processing system is unprotected data storage system endpoint.

4. The method of claim 1, wherein automatically rewriting the query comprises:
   obtaining the set of access control list properties from a mapping file, wherein the mapping file comprises a mapping of tables and columns of one or more datasets to RDF Type and Property classes, respectively, wherein at least one RDF type class in the mapping is associated with at least one access list property of an access controlled table mapped to the RDF type class.

5. The method of claim 4, wherein the at least one access list property indicates that the access controlled table is associated with an access control list in the relational data storage system, and wherein the access control list is mapped to a relational join query that resolves into identifying one or more users who are authorized to access data in the table via a project container associated with the table.

6. The method of claim 1, wherein automatically rewriting the query further comprises:
   binding each of the set of access control list properties to the user parameter.

7. The method of claim 1, wherein the query is a subquery from a federated query.

8. The method of claim 1, further comprising:
   automatically modifying, prior to the identifying, the query to include the user parameter.

9. An information processing system for providing access control to unprotected data storage system endpoints, the information processing system comprising:
   a memory;
   a processor communicatively coupled to the memory; and
   an access control manager communicatively coupled to the memory and the processor, wherein the access control manager is configured to perform a method comprising:
      receiving an authenticated query request comprising a query associated with an unprotected data storage system endpoint configured to execute queries anonymously;
      identifying a user parameter within the query, wherein the user parameter uniquely identifies a user requesting the query;
      automatically rewriting, based on the user parameter, the query to include a set of access control list properties for one or more subject variables in the query, wherein each of the set of access control list properties configures the query to return data from one or more datasets for which the user is authorized to access, where the one or more datasets are stored within a relational data storage system;
      executing the rewritten query against the one or more datasets stored in the relational data storage system;
      receiving, based on the executing, a set of query results comprising at least a portion of the one or more datasets, wherein the set of query results have been filtered based on the set of access control list properties and the user parameter bound to each of the set of access control list properties; and
      transmitting the set of query results to a computing device.

10. The information processing system of claim 9, wherein the automatic rewriting of the query configures the unprotected data storage system endpoint to execute the rewritten query anonymously while protecting the one or more datasets from unauthorized access.

11. The information processing system of claim 9, wherein identifying the user parameter and automatically rewriting the query are based on:

identifying an information processing system from which the query request was received;

comparing a unique identifier of the information processing system with a list of client authorized to connect to the unprotected data storage system endpoint; and determining, based on the comparing, that the information processing system is unprotected data storage system endpoint.

12. The information processing system of claim 9, wherein automatically rewriting the query comprises:

obtaining the set of access control list properties from a mapping file, wherein the mapping file comprises a mapping of tables and columns of the one or more datasets to RDF Type and Property classes, respectively, wherein at least one RDF type class in the mapping is associated with at least one access list property of an access controlled table mapped to the RDF type class, wherein the at least one access list property indicates that the access controlled table is associated with an access control list in the relational data storage system, and wherein the access control list is mapped to a relational join query that resolves into identifying one or more users who are authorized to access data in the table via a project container associated with the table.

13. The information processing system of claim 9, wherein the query is a sub-query from a federated query.

14. The information processing system of claim 9, wherein the method further comprises:

automatically modifying, prior to the identifying, the query to include the user parameter.

15. A computer program product for providing access control to unprotected data storage system endpoints, the computer program product comprising:

A non-transitory storage medium readable by a processing circuit and storing instructions for execution by the processing circuit for performing a method comprising:

receiving an authenticated query request comprising a query associated with an unprotected data storage system endpoint configured to execute queries anonymously;

identifying a user parameter within the query, wherein the user parameter uniquely identifies a user requesting the query;

automatically rewriting, based on the user parameter, the query to include a set of access control list properties for one or more subject variables in the query, wherein each of the set of access control list properties configures the query to return data from one or more datasets for which the user is authorized to access, where the one or more datasets are stored within a relational data storage system;

executing the rewritten query against the one or more datasets stored in the relational data storage system;

receiving, based on the executing, a set of query results comprising at least a portion of the one or more datasets, wherein the set of query results have been filtered based on the set of access control list properties and the user parameter bound to each of the set of access control list properties; and transmitting the set of query results to a computing device.

16. The computer program product of claim 15, wherein the automatic rewriting of the query configures the unprotected data storage system endpoint to execute the rewritten query anonymously while protecting the one or more datasets from unauthorized access.

17. The computer program product of claim 15, wherein identifying the user parameter and automatically rewriting the query are based on:

identifying an information processing system from which the query request was received;

comparing a unique identifier of the information processing system with a list of client authorized to connect to the unprotected data storage system endpoint; and determining, based on the comparing, that the information processing system is an unprotected data storage system endpoint.

18. The computer program product of claim 16, wherein automatically rewriting the query comprises:

obtaining the set of access control list properties from a mapping file, wherein the mapping file comprises a mapping of tables and columns of the one or more datasets to RDF Type and Property classes, respectively, wherein at least one RDF type class in the mapping is associated with at least one access list property of an access controlled table mapped to the RDF type class, wherein the at least one access list property indicates that the access controlled table is associated with an access control list in the relational data storage system, and wherein the access control list is mapped to a relational join query that resolves into identifying one or more users who are authorized to access data in the table via a project container associated with the table.

19. The computer program product of claim 15, wherein the query is a sub-query from a federated query.

20. The computer program product of claim 15, wherein the method further comprises:

automatically modifying, prior to the identifying, the query to include the user parameter.

* * * * *